United States Patent [19]

Okada et al.

[11] 4,230,225
[45] Oct. 28, 1980

[54] STORAGE CONTAINER FOR RECORDING TAPE CARTRIDGE

[75] Inventors: Shuhei Okada, Toyonaka; Masana Uozumi, Takatsuki; Masanori Matsuura, Yawata; Masazumi Sadaike, Ibaraki, all of Japan

[73] Assignee: Hitachi Maxell, Ltd., Osaka, Japan

[21] Appl. No.: 970,395

[22] Filed: Dec. 18, 1978

[30] Foreign Application Priority Data

Dec. 19, 1977 [JP] Japan .................... 52/171461[U]

[51] Int. Cl.$^3$ .......................................... B65D 85/672
[52] U.S. Cl. ................... 206/387; 242/68.3; 206/493
[58] Field of Search ............... 206/387, 389, 397, 408, 206/493; 242/68.3, 199

[56] References Cited

U.S. PATENT DOCUMENTS

| | | | |
|---|---|---|---|
| 3,552,671 | 1/1971 | Wood | 242/68.3 |
| 3,666,193 | 5/1972 | Wellington et al. | 242/68.3 |
| 3,759,465 | 9/1973 | Janssen et al. | 242/199 |
| 3,797,036 | 3/1974 | Eibensteiner | 242/199 X |
| 3,978,985 | 9/1976 | Zinnbauer | 206/387 |
| 4,078,657 | 3/1978 | Schurman | 206/387 |
| 4,147,314 | 4/1979 | Maulsen | 242/199 X |

Primary Examiner—Herbert F. Ross
Attorney, Agent, or Firm—Birch, Stewart, Kolasch and Birch

[57] ABSTRACT

This invention is directed to a storage container for a magnetic recording tape cartridge comprising a pair of tape hubs each having six hub-toothings located at equal space and projected radially inwardly within a drive shaft inserting hole of the hub. The container comprises an open receptacle container body having a pair of side walls, a bottom wall and an end wall connected with each of the side walls at one end thereof; a lid member connected with the receptacle container body for rotation to close the container; and a pair of hub locking members disposed in either the receptacle container body or the lid member so as to lock the hubs against rotation. Each of the hub locking members comprises a short column like boss engageable within the drive shaft inserting hole of the hub, and having a cone shaped top portion and two engaging keys substantially radially projected from the boss, whereby operation of the lid member for opening and closure can be assured and rotation of the tape hubs can be effectively prevented when the magnetic recording tape cartridge is enclosed in the storage container.

22 Claims, 28 Drawing Figures

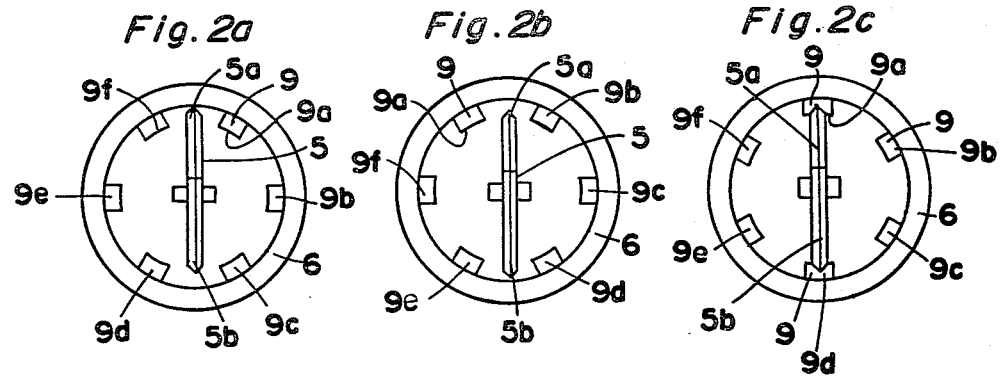
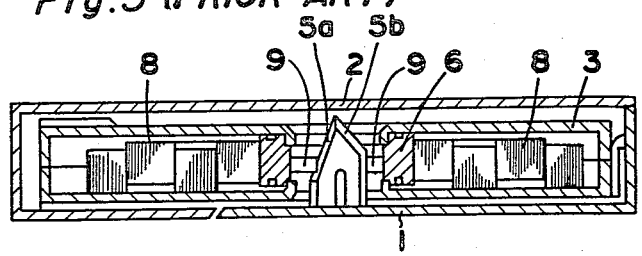
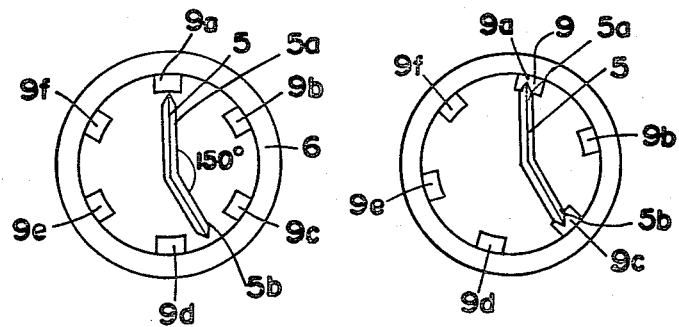

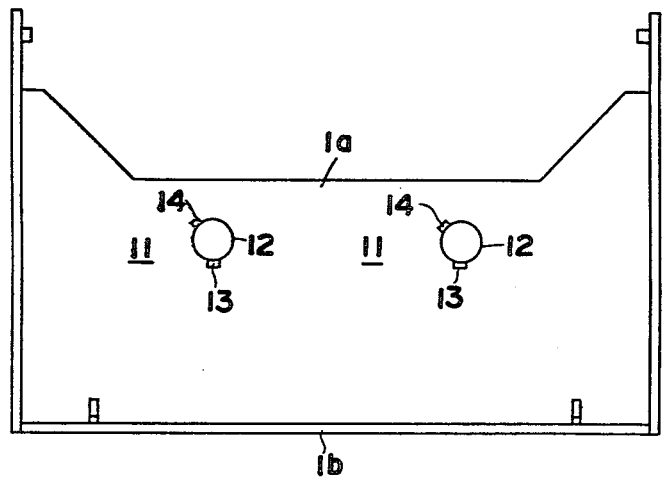
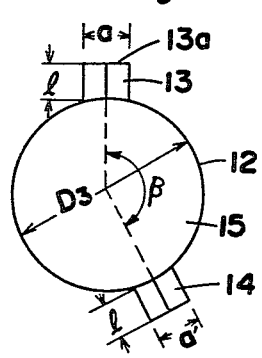
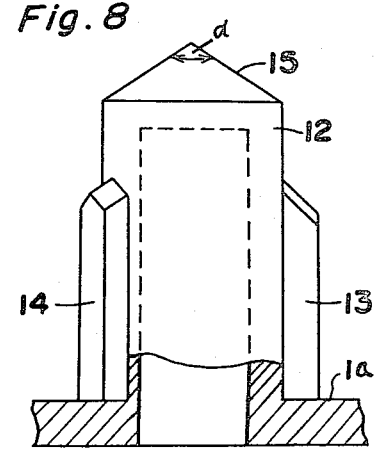
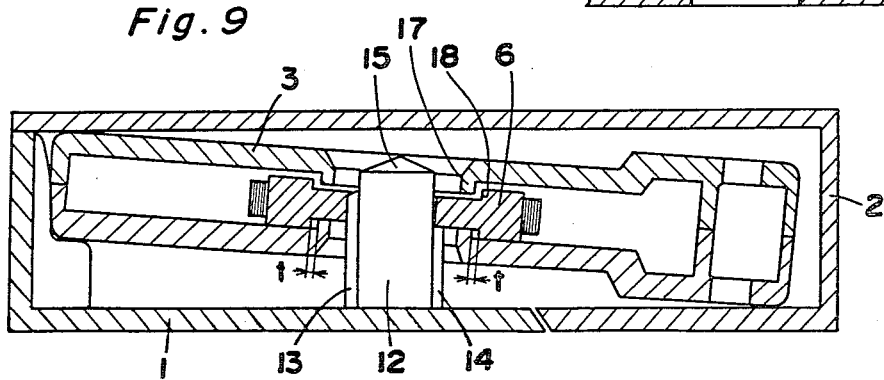

STORAGE CONTAINER FOR RECORDING TAPE CARTRIDGE

BACKGROUND OF THE INVENTION

The present invention relates to a storage container for a magnetic tape cartridge, more particularly to a storage container provided with means for preventing rotation of tape hubs provided in the magnetic tape cartridge.

A conventional storage container of this type is disclosed, for example, in U.S. Pat. No. 3,272,325. This container is composed, as shown in FIG. 1, of a receptacle container body 1 made of polystyrene resin, acrylic resin, or the like and a lid 2, which is pivotally supported on the body 1 to permit opening and closing the body 1 and a magnetic tape cartridge 3 is inserted from its front side into the pocket 4 provided on one side of the lid 2. When the lid 2 is closed, two plate-like lugs 5 which project from the bottom wall 1a of the body 1 are adapted to engage with respective driving shaft insertion holes of the hubs 6 to prevent rotation of the hubs 6, by which the magnetic tape wound on the hubs 6 is prevented from being loosened in the magnetic tape cartridge 3.

The action of preventing the rotation of the hubs 6 by means of the lugs 5 is shown in FIG. 2. It is well known that each of the hubs 6, which are of synthetic resin, is standardized to have six protruding hub-toothings 9 on its inner circumferential surface. Each of the hubs 6 is rotatably supported with play relative to the driving shaft insertion hole 10 of the magnetic tape cartridge 3. Each lug 5 for preventing the rotation of the hub 6 is formed at its top end portion into knife edges 5a and 5b, so that even when an end portion thereof comes into collision with the projecting end face of one of the hub-toothings 9, the hub 6 can slide the top end portion of the lug 5 resulting in engagement in the hub 6. Thus, as shown in FIGS. 2a and 2b, either one end 5a or the other end 5b of the lug 5 rests in the space between the adjacent hub-toothings 9 to prevent free rotation of the hub 6. However, when both ends 5a and 5b of the lug 5 come to the respective centers of the projecting ends of the two hub toothings 9a and 9d, as shown in FIG. 2c, it sometimes occurs that said two ends 5a and 5b wedge into the end portions of the hub-toothings 9a and 9d.

On the other hand, the magnetic tape cartridge of this kind is put in a storage container by means of an automatic package machine when it is supplied from the manufacturing process. In this case, the lid 2 is forcibly closed by the automatic package machine even under the state where the hub-toothings 9a and 9d are caught by the knife edges 5a and 5b, the hub 6 is pushed up by the knife edges 5a and 5b in the magnetic tape cartridge 3 and is held in a position spaced up from the bottom surface of the cartridge, as shown in FIG. 3. When the container is carried under the above state, being rattled, the magnetic tape 8 wound on the hub is partly let down to assume a stepped form, or a roll of the magnetic tape 8 taken up on the hub 6 slides down from the hub 6, thereby providing a cause for the defective running of the magnetic tape at the time of the use of the magnetic tape cartridge. These were the drawbacks experienced with the conventional storage container for the magnetic tape.

The above problems come to the notice of the consumer when he is about to use the magnetic tape cartridge after it is packed and delivered from the factory.

There is another defect that, if, in an extreme case, the lugs 5 of the container strongly wedge into the hub, the lid 2 of the storage container is hard to open.

The present inventors have attempted to eliminate the above defects by modifying the shape of the lug 5 for preventing the rotation of the hub 6. The first trail was to bend the plate like lug 5 into an angled cross-sectional form, as shown in FIGS. 4a and 4b. According to said contrivance, as the lug 5 is bent at an angle of about 150° to form the two angled sides, even when one end 5a of the lug 5 comes into collision with one of the hub toothings 9, the hub 6 is slid in a direction of the side 5a without causing wedging, and on the other hand the other end 5b is always received between the opposed hub toothings 9c and 9d. However, even by said contrivance, there is a possibility that, when the magnetic tape cartridge 3 per se set in the lid 2 is displaced to either right or left in the pocket 4 and when idle movement of the hub 6 is added, the lug may be brought to a state shown in FIG. 4b, by which the two ends 5a and 5b of the lug 5 wedge into the hub toothings 9a and 9c.

As a result of the study specially on the shape of the lug for preventing the rotation of the hub through the above trial-and-error, the present invention has been developed by constituting a projection for preventing the rotation of the hub by a columnar boss with a corn top portion and the first and second engaging keys protruding generally radially from said boss, thereby eliminating the above defects inherent in the conventional storage container.

SUMMARY OF THE INVENTION

An object of the present invention is to provide a storage container for magnetic tape cartridge which assures opening and closing of the lid with more ease and steadiness and which can effectively prevent the rotation of the hub in the magnetic tape cartridge.

According to the present invention, there is provided a storage container for a magnetic recording tape cartridge comprising a pair of tape hubs each having six hub-toothings located at equal space and projected radially inwardly within a drive shaft inserting hole of the hub, said storage container comprises, an open receptacle container body having a pair of side walls, a bottom wall and an end wall connected with each of said side walls at one end thereof;

a lid member connected with said receptacle container body for rotation to close the container;

a pair of hub locking members disposed in either of the receptacle container body or the lid member so as to lock said hubs against rotation, each of the hub locking members comprises a short column like boss engageable within the drive shaft inserting hole of the hub, and having a cone shaped top portion and two engaging keys substantially radially outwardly projected from said boss.

Preferred embodiments of the present invention will be fully described below in reference to the attached drawings.

BRIEF EXPLANATION OF THE DRAWINGS

FIGS. 2a, 2b and 2c are the views to illustrate the principles of working of the means for preventing the rotation employed in a conventional storage container shown in FIG. 1;

FIG. 3 is a vertical cross-section of the storage container showing defects which occurs in a conventional storage container;

FIGS. 4a and 4b are plan views of a hub and stopping member to illustrate the principles of working in the case of the use of an angled lugs;

FIG. 6 is a top plan view of a receptacle container employed in the embodiment shown in FIG. 5;

FIG. 7 is a top plan view of a hub locking member employed in the embodiment shown in FIG. 5;

FIG. 8 is a side view of the hub locking member shown in FIG. 7;

FIG. 9 is a cross sectional view of a storage container shown in FIG. 5 and showing a magnetic recording tape cartridge contained therein;

DETAILED DESCRIPTION OF THE INVENTION

Figure 1:
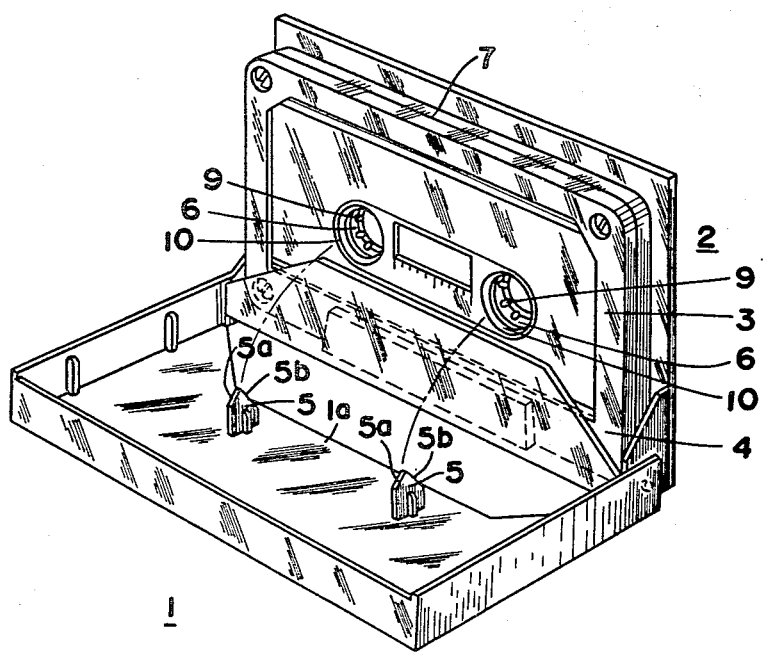
FIG. 1 is a perspective view of a conventional storage container with its lid open.

It is noted that like parts are designated by like reference numerals.

Figure 5:
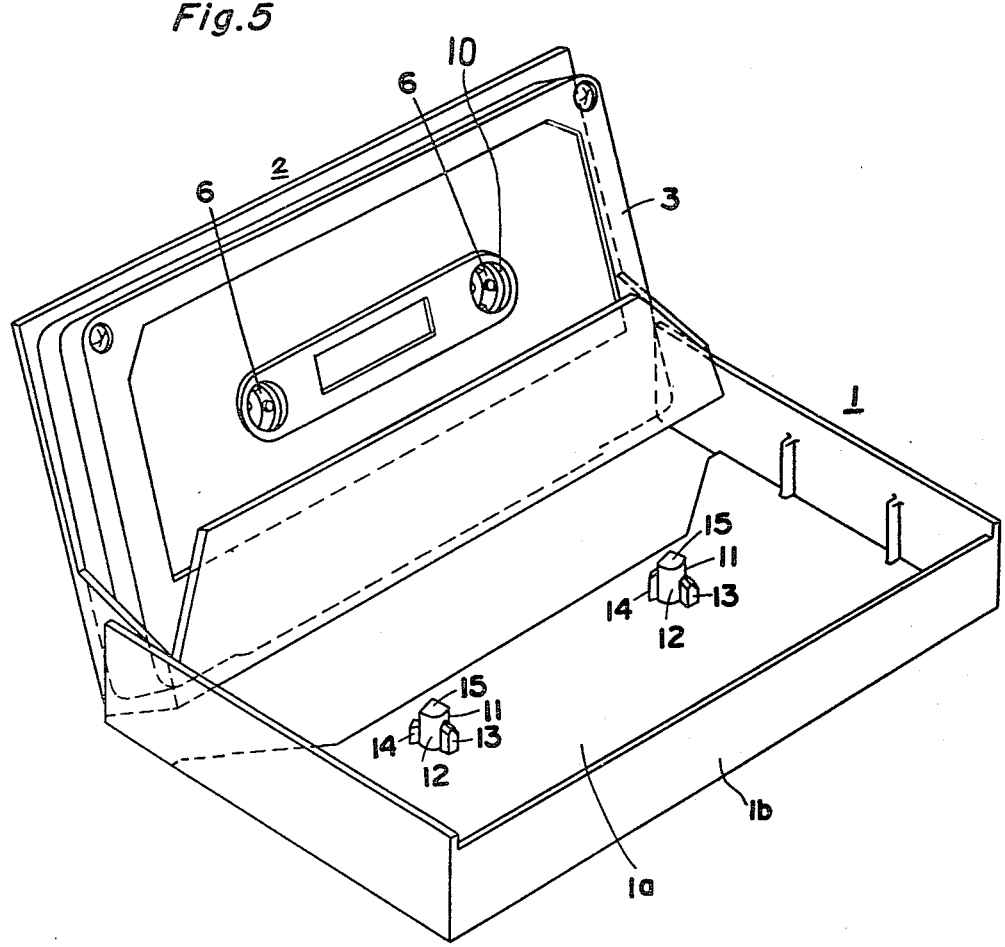
FIG. 5 is a perspective view of an embodiment of a storage container according to the present invention.

FIG. 5 shows a storage container for a magnetic recording tape cartridge, suitable for storing a so-called Philips type magnetic recording tape cartridge "compact cassette", as a preferred embodiment of the present invention, wherein the receptacle container body 1 and the lid 2 are constituted in the same manner as in the conventional storage container of this kind. A pair of hub locking members 11 for preventing rotation of tape hubs 6 of the magnetic tape cartridge 3 are provided on the bottom surface 1a of the body 1 at the positions corresponding to the driving shaft insertion holes 10 of the magnetic tape cartridge 3 as shown in FIG. 6. The locking members are parallel and protrude upwardly from the container bottom surface 1a. The hub locking members 11 are each constituted by a columnar boss 12 and the two engaging keys 13 and 14 projected radially outwardly from said boss 12.

FIGS. 7 and 8 illustrate an example of the hub locking member 11 for preventing the rotation of the hub applied to the storage container. In this embodiment, a columnar boss 12 having the diameter of about 6.7 mm is vertically erected at a height of about 12 mm from the bottom wall 1a of the body 1, with its top portion tapered to form a cone 15 of the vertical or apex angle $\alpha$ of about 135°.

Figure 10A:
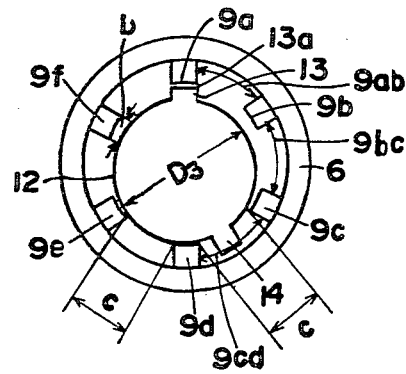
FIGS. 10a through 10d are the plan views each showing hubs and hub locking member employed in the embodiment of the present invention to illustrate the principle of working of the hub and hub locking member when they are engaged.

From each boss 12 the first engaging key 13 protrudes toward the front wall 1b of the body 1 and the second engaging key 14 protrudes toward the right rear portion, respectively in radial directions at the length l of about 1.2 mm, with the angle $\beta$ between the engaging keys 13 and 14 being set at about 150°. The angle $\beta$ between the engaging keys 13 and 14 is so determined that, when one hub toothing 9a is positioned opposite to the first engaging key 13, the second engaging key 14 is positioned in the intermediate space defined by other hub toothings 9c and 9d as shown in FIG. 10a.

The upper ends of the engaging keys 13 and 14 are positioned on the level lower than the bottom end of the cone 15 of said boss 12, and are inclined downward from said boss 12 with an angle of inclination of about 20° to the bottom surface 1a. The upper ends of the engaging keys 13 and 14 are pointed in trigonal pyramid forms. The width $a$ and $a'$ of the engaging keys 13 and 14 are of about 2.0 mm. In general, the width $a$ of one key 13 is set to be smaller than the distance c between the tub toothings adjacent each other (about 2.8 mm) and larger than the difference obtained by deducting the total of the width $a'$ of the other key 14 and the diameter b of the section of the hub toothings (about 1.5 mm) from the distance c between the two hub-toothings, namely $a<c$ and $a>c-(a'+b)$.

Figure 10B:
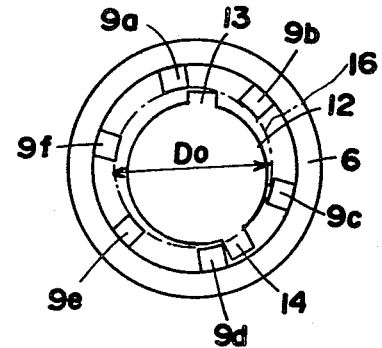
Figure 11:
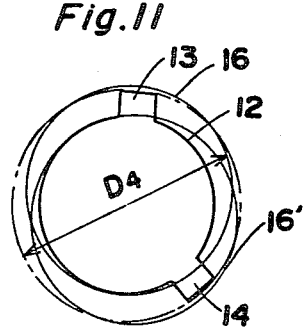
FIG. 11 is a view to show the relation between a hub locking member of the present invention and the inscribed circle along the hub-toothings.

Also, the total length of the diameter D3 of the boss 12 (6.7 mm) and the length l of the engaging keys 13 or 14 (1.2 mm), D3+l=6.7+1.2=7.9 mm, is smaller by about 0.1 mm than the diameter D0 (8.0 mm) of the above inscribed circle 16 along each end face of the hub toothings 9 (see FIGS. 10b or 11).

By setting the respective dimensions of the hub locking member 11 as described above, it is understood from FIG. 11, that since either of the engaging keys 13 or 14 is out of the inscribed circle 16 or 16', when any one of the hub-toothings 9 opposes to one of the engaging key 13 (or 14), another engaging key 14 (or 13) is located in the space between two hub-toothings 9c and 9d (or 9a and 9b).

On the other hand, generally, the hub 6 is placed with a play t of about 0.7 mm between the hub supporting wall 17 of the magnetic tape cartridge 3 and the shoulder 18 of the hub 6. Accordingly, the hub 6 can be moved idly within the play t (see FIG. 9).

Figure 10C:
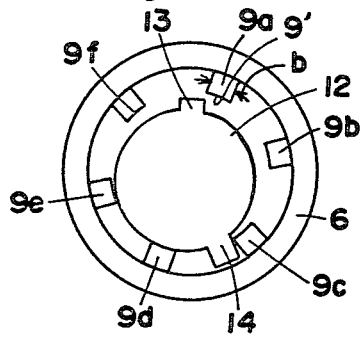

Therefore, when the width of the hub-toothing 9 is smaller than predetermined value, the hub 6 is unexpectedly brought into rotation as hereinafter described. This mechanism is explained with reference to FIGS. 10a through 10d and 11 as follows: FIGS. 10b and 10c show critical states for the engaging key 14 to be in contact with either hub-toothings 9c or 9d. Between the both states shown in FIGS. 10b and 10c, the hub-toothing 9c can be offset relative to the engaging key 14 by the difference (c−a') obtained by deducting the width a' of the engaging key 14 from the distance c between the hub-toothings 9c and 9d. In this case, the end face 13a of the other engaging key 13 must be located within the range of the hub-toothing 9a. The maximum length over which the engaging key 13 can move within the range of the hub toothings 9a is (c−a'). Accordingly, if this length of (c−a') were larger than the value of (a+b). the engaging key 13 which had been in contact with or closely opposed to the hub-toothing 9a would be disengaged from the hub-toothing 9a.

When the hub-toothing 9a is disengaged from the engaging key 13 under such state as shown in FIGS. 10b or 10c, the hub 6 may be allowed to rotate by way of planetary movement.

Accordingly, the relation of $(c-a')<(a+b)$ is to be maintained. The above relation between the first and the second engaging keys must be satisfied even when their positions are reversed.

In view of the above relations, when the columnar boss 12 is inserted into the openings of the drive shaft insertion hole of the hub 6 and the drive shaft insertion hole 10 of the magnetic tape cartridge 3 when the lid 2 is closed, if the hub 6 in the magnetic tape cartridge 3 is offset from the regular position, the hub 6 is moved toward the predetermined position by the action wherein the cone 15 of the boss 12 pushes the hub-toothings contacting the cone 15, thereby resulting in engaging of the engaging keys 13, 14 with the hub-toothings 9.

Even if the hub 6 in the magnetic recording tape cartridge 3 is inserted into the boss 12 in such way that a hub-toothing is opposed to the engaging key 14, the hub 6 can be inserted by being guided to a correct position (as shown in FIG. 10a) by the aid of the cone 15 of the boss 12 and the inclined surface on the upper end of the engaging keys 13 and 14.

In this case, the hub 6 may be allowed to move slightly around the axis of the boss 12, but the second engaging key 14 can be engaged with the hub-toothings 9d or 9c to prevent rotation of the hub 6. Such action and effect of the second engaging key 14 is obtained by substantially protruding the first and the second engaging keys 13 and 14 from the boss 12 in such manner that, when the first engaging key 13 is protruded from the boss 12 with a length that the total length (D3+l) i.e., the length of the first engaging key 13 plus the diameter of the boss 12 does not exceed the diameter D0 of the inclined circle along the hub-toothings 9 and when the end face 13a of said first engaging key 13 may be brought into contacting with an end face g' of one of the hub-toothings, e.g. 9a, while the second engaging key 14 is located within the space between the hub-toothings 9c and 9d. And yet the diameter D4 of the circumscribed circle of hub locking member 11 is set to be larger than the diameter D0 of the inserted circle 16 along said hub-toothings 9.

Figure 12:
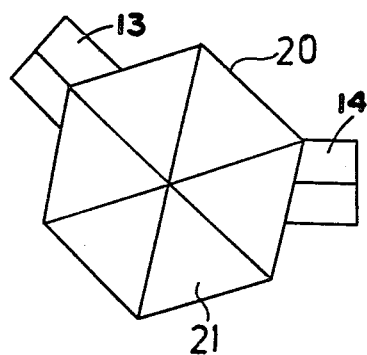
FIG. 12 is a top plan view showing another embodiment of a hub locking member.
Figure 13:
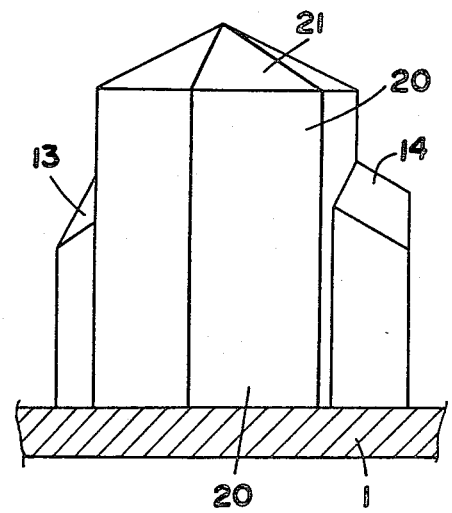
FIG. 13 is a side view of the hub locking member shown in FIG. 12.

In the above embodiment, the boss 12 of the hub locking member 11 for preventing the rotation of the hub 9 is made of a columnar shape with conical top portion. However, the hub locking member 11 need not be of a columnar boss with a conical top portion, but, as shown in FIGS. 12 and 13, be of a post of polygonal cross-section such as ellipse or hexagon boss 20 with polygonal pyramid top portion 21. But, when the hub locking member is formed into a conical topped columnar shape as shown in FIG. 5 in the above embodiment, the hub 6 may slide readily along the conical tapered top portion of the boss, causing the hub to be placed in a correct position where the hub entirely engages with the hub locking member, and, in case of displacing the hub 6 by means of the upper face of the first and/or second engaging keys 13 and/or 14, the hub-toothing comes into contact with the outer periphery of the boss to permit smooth displacement of the hub 6. When the top cone portion 15 of the boss 12 is formed into a tapered configuration with the vertical angle smaller than 160°, displacement of the hub 6 is effectively performed.

Figure 14:
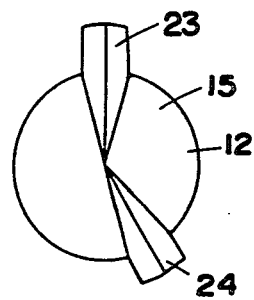
FIG. 14 is a top plan view showing a further embodiment of a hub locking member.
Figure 15:
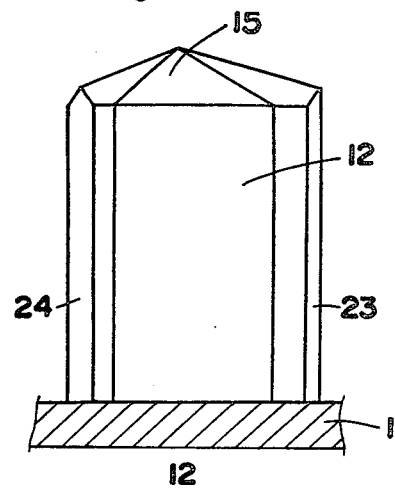
FIG. 15 is a side view of the hub locking member shown in FIG. 14.

Another embodiment of the hub locking member is shown in FIGS. 14 and 15, wherein two engaging keys 23 and 24 are protruded from the columnar boss 12 having the conical top portion 15. The engaging keys 23 and 24 extend up to the conical top portion 15.

Figure 16:
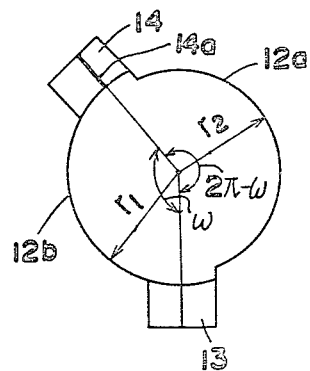
FIG. 16 is a top plan view showing a still further embodiment of a hub locking member.
Figure 17:
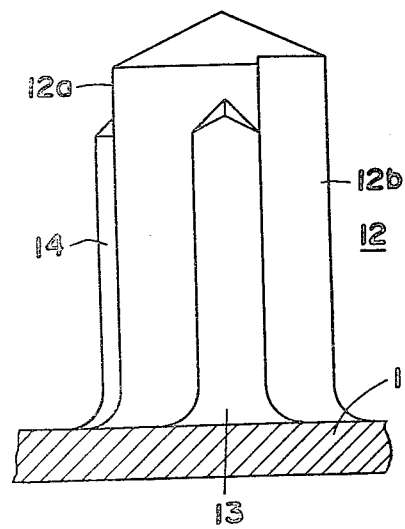
FIG. 17 is a side view of the hub locking member shown in FIG. 16.

A further embodiment of the hub locking member is shown in FIGS. 16 and 17. In this embodiment, the boss 12 is constituted in combination of two half columnar parts 12a and 12b with different radii $r_1$ and $r_2$. The ridgeline 14a of the engaging key 14 is offset from the center of the engaging key 14.

Figure 18:
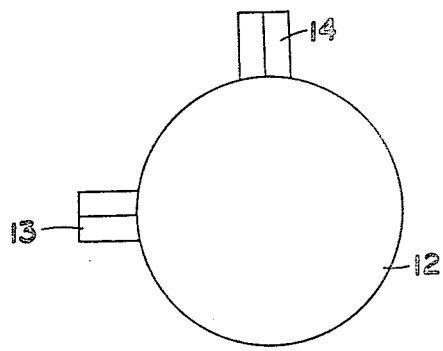
FIG. 18 is a top plan view showing a still further embodiment of a hub locking member.

A still further embodiment of the hub locking member is shown in FIG. 18, wherein two engaging keys 13 and 14 are located with the angle of about 90°.

In any of the embodiments described above, in order to prevent the rotation of the hub 6 when the end of the first engaging key 13 is directly contacted or opposed with the end of a hub-toothing, for example 9a, the second engaging key 14 may be in a position to receive the hub idly in the space which comes either the first space 9ab or the second space 9bc (see FIG. 10a). But, when the second engaging key 14 is so positioned as to receive the hub 6 idly in the third space 9cd, the allowance of the length of projection of the engaging key 14 becomes the largest, by which the projection can prevent the rotation of the hub easily and securely.

The first engaging key 13 and the second engaging key 14 are not required to have the same length of projection from the boss 12. Their lengths of projection may be selected according to necessity. Also, it is possible to provide each engaging key with a ridge at its top, so that the ridgeline can help to guide the hub-toothing.

Further, the hub locking members for preventing the rotation of the tape hub adopted in the present invention may be provided on either the receptacle container body 1 or the lid 2 which constitutes the storage container. It is not essential for the hub locking members to be provided by the number corresponding to the number of the hubs of the magnetic recording tape cartridge to be contained in the storage container. However, in order to store a magnetic tape cartridge in which two hubs, engaging a magnetic tape at the starting end and the terminal end thereof respectively, are mounted in freely movable state as in the so-called "compact cassette" of Philips type, it is preferred to provide two hub locking members for preventing the rotation of the hubs at the positions corresponding to the hubs respectively, because, by so providing, charging of the magnetic tape cartridge in the storage container at a fixed position is assured and the rotation of the hub is effectively prevented.

In a storage container having a receptacle container body and a lid, being operable to close the receptacle container body, with a magnetic recording tape loaded within the pocket as shown in FIG. 1 or FIG. 5, when the hub locking members according to the present invention are provided on the bottom wall of the receptacle container body, desirable results can be expected because of a successful prevention of wedging of the engaging keys of the hub locking members into the hub-toothings.

In case of forming the hub locking members by molding with a plastic material in one body with the body 1 or with the lid 2 of the storage container, it is preferred to form the hub locking members with hollow space therein in which case deformation of boss that may result from shrinkage in molding can be prevented.

Figure 10D:
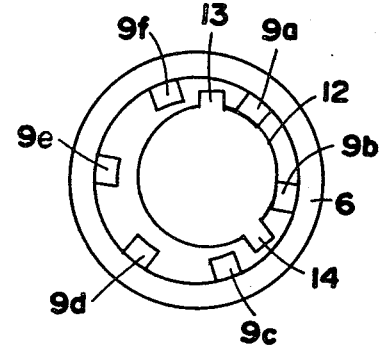

According to the present invention, when the lid 2 in which the magnetic tape cartridge 3 is loaded is closed to enclose the cartridge 3 in the body 1 under such condition that some of the hub-toothings 9 lie on the boss 12, said hub-toothings 9 come to contact the cone 15 of the boss 12 causing the hub 6 to move in both transverse direction and downward direction along said cone 15. As a result, the hub 6 may be brought in the engaged position as shown in FIG. 10d where the rotation of the hub 6 is prevented.

However, when two of the hub-toothings 9 contact onto the two engaging keys 13 and 14 at the time of enclosing into the body, the hub 6 may not be successfully engaged with the hub locking member 11.

In order to avoid such state, according to the present invention, the radius of the boss 12 should be selected within the predetermined range as explained hereinafter.

Figure 20:
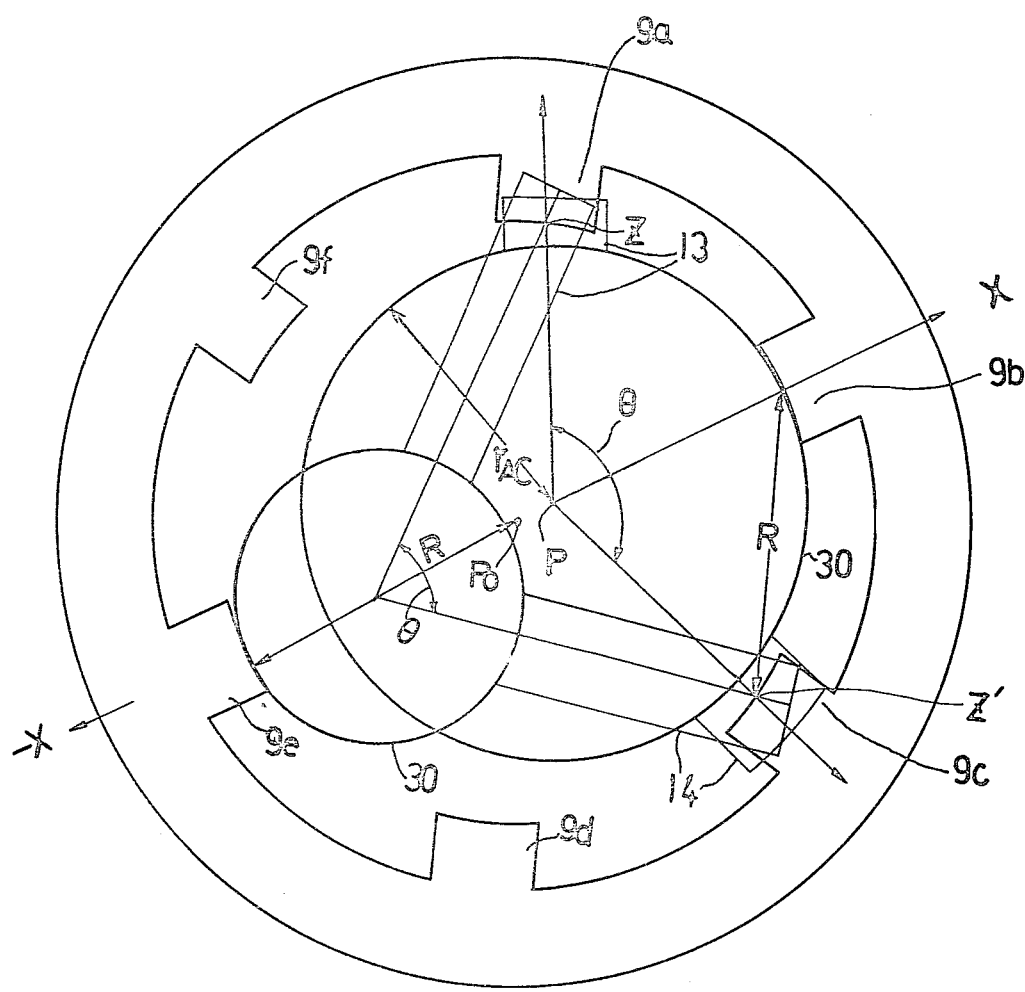
FIGS. 20 through 22 respectively show relationships between a hub and a hub locking member.
Figure 21:
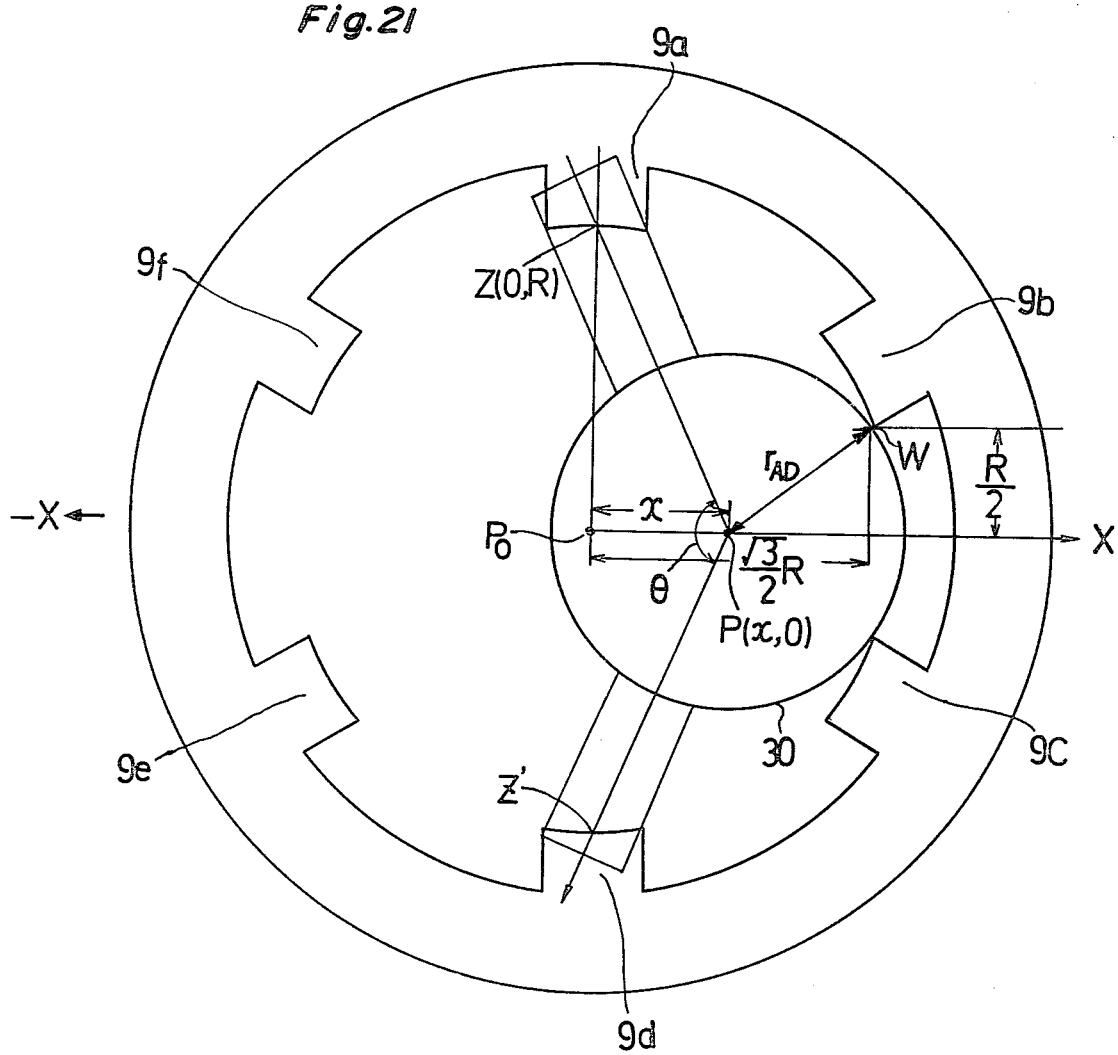
Figure 22:
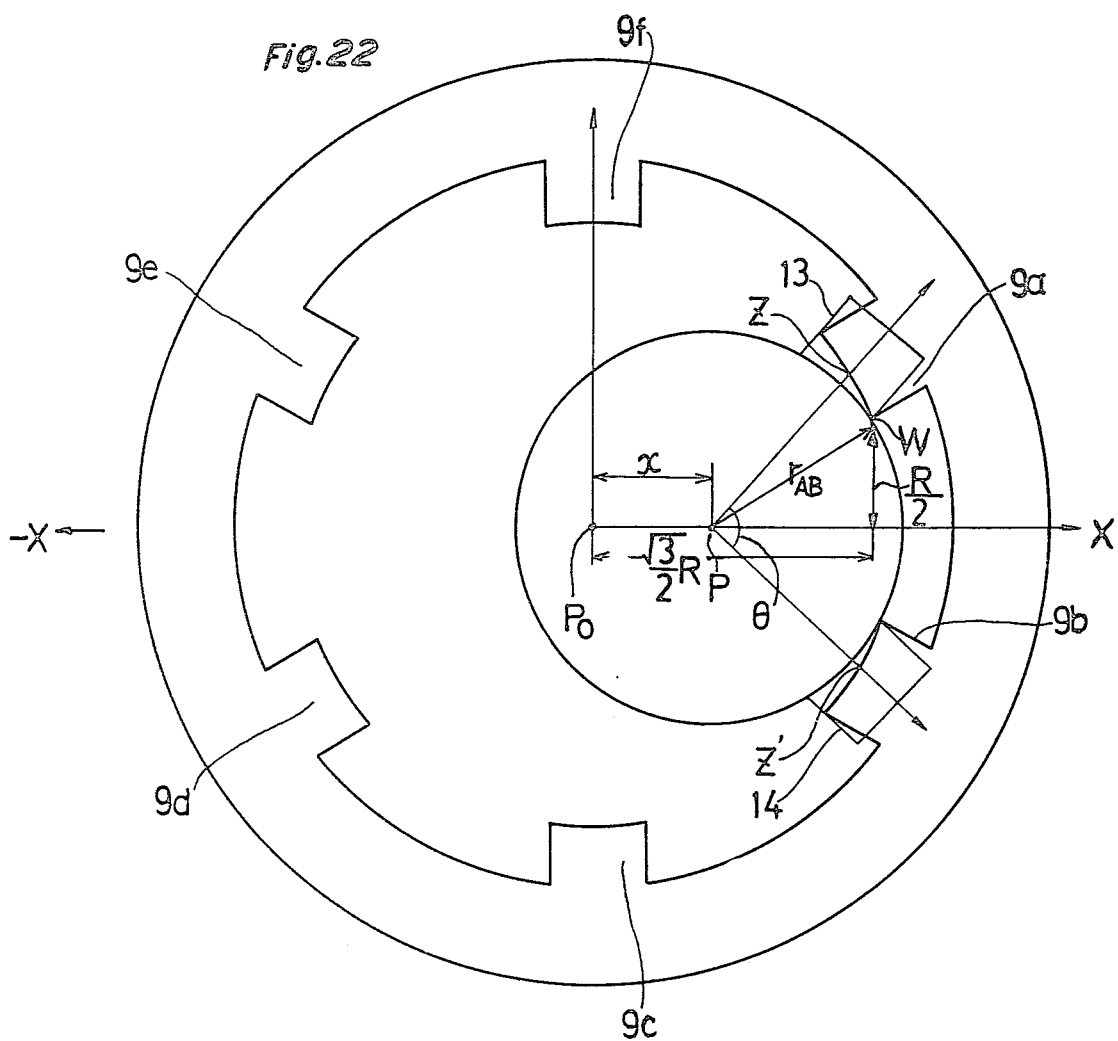

Before the description proceeds, it is noted that such state that the ridgelines of any two hub toothings contact the ridgelines of both of the engaging keys 13 and 14 is designated as critical state. Various critical states are shown in FIGS. 20 through 22. This critical state may cause collision of the hub-toothings and engaging keys which prevents the cartridge from being contained in the storage container correctly.

An advantage of the present invention is to readily avoid the critical state as hereinafter explained.

In order to avoid the occurrence of the critical state, the boss 12 must push the hub to move it in the directions of either X or −X shown in FIGS. 20 to 22 when the cartridge 3 is enclosed in the container. For this purpose, as understood from FIG. 20, for example, the radius r of the boss 12 must be larger than the radius $r_{AC}$ of the critical circle 30.

Assuming that Z is such point that the ridgeline of the hub-toothing 9a contacts the ridgeline of the engaging key 13, while Z' is such point that the ridgeline of the hub-toothing 9c contacts the ridgeline of the engaging key 14 (such point is designated as critical point), and the angle θ represents <Z P Z' (critical angle): wherein P is the center of the boss 12.

(i) Where both engaging keys 13 and 14 engage with two hub-toothings 9a and 9c as shown in FIG. 20;

Where the boss 12 pushes the hub-toothing 9b, as shown in FIG. 20, to move the hub 6 toward X direction, the angle θ falls within the range of 120°<θ<240°.

Then, the following equation;

$$R \sin \left(\frac{2\pi}{3} - \frac{\theta}{2}\right) = r_{AC} \sin \frac{\theta}{2} \quad (1)$$

is established,
wherein R is the radius of the inscribed circle along the inner face of the hub-toothings; thus, $$r_{AC} = \frac{R \sin \left(\frac{2}{3}\pi - \frac{\theta}{2}\right)}{\sin \frac{\theta}{2}} \quad (1')$$

Where the boss 12 pushes the hub-toothings 9e to move the hub 6 toward −X direction, the angle θ falls within the range of 60°<θ<120°;
Then, following equation $$\sqrt{3}\, R \sin 30° = \left(\frac{3R}{2} - r_{AC}\right) \tan \frac{\theta}{2} \quad (2)$$

is established,
thus, $$r_{AC} = \frac{-\sqrt{3}\, R + 3R \tan \frac{\theta}{2}}{2 \tan \frac{\theta}{2}} \quad (2')$$

(ii) In the case where the critical points Z, Z' occur on both hub-toothings 9a and 9b as shown in FIG. 21;

where the boss 12 pushes the hub-toothings 9b and 9c to move the hub 6 toward X direction, the angle θ falls within the range of 90°<θ180°.

By adopting the rectangular co-ordinate with the origin coinciding the center P0 of the hub, the position of the center P of the boss is (x, 0) while the critical points Z is (0, R). Since <Z P P0 is θ/2, then $$x = R \cot \frac{\theta}{2} \quad (3)$$

On the other hand, the position of W where the boss contacts the hub-toothing 9b is nearly equaled to $$\left(\frac{\sqrt{3}}{2} R, \frac{R}{2}\right).$$

Thus, $$r_{AD} = \sqrt{\left(\frac{\sqrt{3}}{2} R - x\right)^2 + \left(\frac{R}{2}\right)^2} \quad (4)$$

is established.

Where the boss 12 pushes the hub-toothings 9e and 9f to move the hub 6 toward −X direction, the angle θ falls within the range of 180°<θ<270°, then $$r_{AD} = \sqrt{\left(\frac{\sqrt{3}}{2} R - x\right)^2 + \left(\frac{R}{2}\right)^2} \quad (5)$$

is also established; wherein $$x = -R \cot \frac{\theta}{2}.$$

(iii) Where the critical points Z and Z' occur on the hub-toothings 9a and 9b as shown in FIG. 22;

where the boss 12 pushes the hub-toothings 9a and 9b to move the hub 6 toward the X direction, the angular θ falls within the range of 60°<θ<180°. The position of W where the boss contacts the hub-toothing 9a is nearly equal to $$\left(\frac{\sqrt{3}}{2} R, \frac{R}{2}\right),$$

thus, $$r_{AB} = \sqrt{(\frac{\sqrt{3}}{2} R - x)^2 + (\frac{R}{2})^2} \quad (6)$$

is established;
wherein $$x = \frac{\sqrt{3}}{2} R - \frac{R}{2} \cot \frac{\theta}{2}.$$

In the case where the boss 12 pushes the hub-toothings 9d and 9e to move the hub 6 toward $-X$ direction, the angle $\theta$ falls within the range about $32° < \theta < 60°$. The position of the center P of the boss 12 is represented by $(-x, 0)$.

Thus, the value x appearing in the equation (6) is replaced by $$x = -(\frac{\sqrt{3}}{2} R - \frac{R}{2} \cot \frac{\theta}{2})$$

Figure 19:
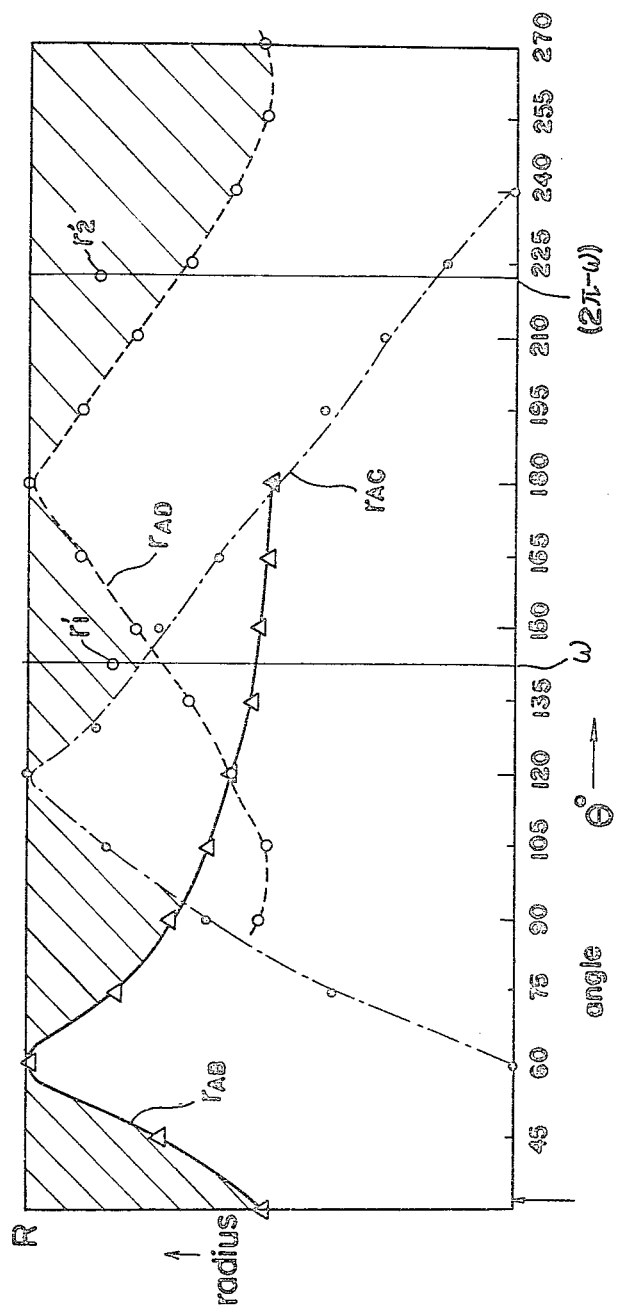
FIG. 19 is a graph showing a relationship between the angle of $\theta$ and the radii of the boss of the hub locking member.

FIG. 19 shows various curvatures plotted by the equations (1'), (2'), (4), (5) and (6) wherein vertical axis shows the values of the radii $r_{AC}$, $r_{AB}$ and $r_{AD}$ while the horizontal axis shows the angle $\theta$.

It is sufficient to choose the radius of the boss 12 according to the present invention in the range higher than any curvatures as shown by the shadowed portions in FIG. 19.

An example of the application of the equations mentioned above and graph shown in FIG. 19 is explained below, Taking the angle $\omega$ shown in FIG. 17 as 142°, the $(2\pi - \omega)$ becomes 218°. Assuming that radius R is 4 mm (which is the radius of the inscribed circle of the hub-toothings of "Compact Cassette").

By putting the values $\omega$ and R into any of the equations defined as above depending on the angle $\omega$ or $(2\pi - \omega)$, two sets of radii are calculated as follows:

$r_{AC}$ (142°) = 3.19mm  $\quad r_{AC}$ (218°) = 0.8mm
$r_{AD}$ (142°) = 2.92mm  $\quad r_{AD}$ (218°) = 2.92mm
$r_{AB}$ (142°) = 2.115mm $\quad r_{AB}$ (218°) = impossible Thus, both radii $r_1$ and $r_2$ of the boss 12 shown in FIG. 17 may be sufficient in case where $r_1 \leq$ max $(r_{AC}(142°), r_{AD}(142°)$ or $r_{AB}(142°))$
$\quad = 3.19$mm,
$r_2 \leq$ max $(r_{AC}(218°), r_{AD}(218°))$
$\quad = 2.92$ mm.

Such radii are depicted by $r_1'$ and $r_2'$ in FIG. 19. In the embodiment shown in FIG. 17, the radius $r_1$ is set at 3.27 mm and the radius $r_2$ is set at 2.92 mm so that the boss 12 always prevents the occurrence of the critical state defined as above.

What is claimed is:

1. A storage container for a magnetic recording tape cartridge which has a pair of tape hubs, each having a plurality of hub-toothings equally spaced and having inner facing end faces and projected radially inwardly within a drive shaft inserting hole of the hub, said container comprising:

an open receptacle container body having a pair of side walls, a bottom wall and an end wall connected with each of said side walls at one end thereof;
a lid member connected with said receptacle container body for rotation to close the container; and
a pair of hub locking members disposed in either the receptacle container body or the lid member so as to lock said hubs against rotation, each of the hub locking members comprising a column like boss engageable within the drive shaft inserting hole of the hub, and two engaging keys substantially radially outwardly projected from said boss, wherein the improvement is characterized in that said boss has a substantially conical top portion and said keys are arranged in such a manner that at least one of said engaging keys extends into a space between two adjacent hub-toothings while the outermost portion of the other engaging key is located in radial alignment with the end face of any one of said hub-toothings.

2. A storage container as claimed in claim 1, wherein said boss has a radius or radii smaller than the radius of the inscribed circle along the end faces of each of the hub-toothings and larger than the values $r_{AC}$, $r_{AB}$ and $r_{AD}$ defined by the equations (A), (B) and (C) with respect to respective angular spaces $\theta$ and $(2\pi - \theta)$ defined by two lines passing through the center of the boss and respective points where top portions of said engaging keys may contact with corresponding hub-toothings;

$$r_{AC} = \begin{cases} \dfrac{R \sin(\frac{2\pi}{3} - \frac{\theta}{2})}{\sin \frac{\theta}{2}} & (120° < \theta < 240°) \\ \dfrac{-\sqrt{3} R + 3R \tan \frac{\theta}{2}}{2 \tan \frac{\theta}{2}} & (60° < \theta < 120°) \end{cases} \quad (A)$$

wherein R: radius of an inscribed circle defined by end faces of the hub-toothings $$r_{AD} = \sqrt{(\frac{\sqrt{3}}{2} R - x)^2 + (\frac{R}{2})^2} \quad (B)$$

wherein, $x = x_1 = R \cot \frac{\theta}{2}$  $(90° < \theta < 180°)$
$x = -x_1$  $(180° < \theta < 270°)$ $$r_{AB} = \sqrt{(\frac{\sqrt{3}}{2} R - x)^2 + (\frac{R}{2})^2} \quad (C)$$

wherein, $x = x_2 = \dfrac{\sqrt{3} R}{2} - \dfrac{R}{2} \cot \dfrac{\theta}{2}$  $(60° < \theta < 180°)$
$x = -x_2$  $(32° < \theta < 60°)$ the upper ends of the respective engaging keys are lower than the bottom of the cone portion of the boss and being inclined downwardly in a direction away from the boss;

the width of each of the engaging keys is smaller than the space between the adjacent hub-toothings and one of the engaging keys has a width larger than the value of (c−b−a′)

wherein
- c: space of the hub-toothings adjacent each other;
- b: diameter of one hub toothing in the direction of circumference of the hub;
- a′: width of other engaging key the engaging keys project in such manner that the length between front end of one of the engaging keys and a portion of the outer periphery of the boss existing at opposite side of said one of the engaging keys is shorter than the diameter of the inscribed circle along the end of the hub-toothings;

the position of each of the engaging keys is set in such manner that when one of the engaging key is opposed to one of the hub-toothings, another engaging key is located within the space between two hub-toothings adjacent each other;

the space between the two engaging keys is larger than the diameter of one hub-toothing in the direction of the circumference of the hub;

the diameter of the circumscribed circle of the hub-locking member is larger than the diameter of the inscribed circle along the hub toothings.

3. A storage container as claimed in claim 1 or claim 2, wherein each of the engaging keys is disposed in such manner that when one engaging key is opposed to one of the hub-toothings, the other engaging key is located within a space defined by the third and fourth hub-toothings counted from said one of the hub-toothings.

4. A storage container as claimed in claims 1 or 2, wherein the boss of the hub locking member is a cylindrical column.

5. A storage container as claimed in claim 4 wherein said cone shaped top portion of the boss has an apex angle smaller than 160°.

6. A storage container as claimed in claim 4, wherein the boss of the hub locking member is made of a hollow cylindrical body.

7. A storage container as claimed in claims 1 or 2, wherein each of the engaging keys has an equal width.

8. A storage container as claimed in claims 1 or 2, wherein said magnetic recording tape cartridge comprises two hubs freely rotatable therein with a play and a magnetic recording tape being wound therearound, two hub locking members being located on either the receptacle container body or the lid member at the positions corresponding to the respective hubs.

9. A storage container as claimed in claim 8, wherein said hub locking members are located on the bottom wall of the receptacle container body and said lid member has a pocket for containing the magnetic recording tape cartridge.

10. A storage container as claimed in claim 4, wherein said cylindrical columnar boss is formed from two parts of cylindrical column having different radii.

11. A storage container as claimed in claim 1, wherein each of said tape hubs has six hub-toothings.

12. A storage container as described in claim 11, wherein the height of said boss is greater than the height of said keys.

13. A storage container as defined in claim 11, wherein the engaging keys project in such a manner that the length between the front end of one of the engaging keys and a portion of the outer periphery of the boss existing at the opposite side of said one of the engaging keys is shorter than the diameter of the inscribed circle along the end of the hub-toothings; and the diameter of the circumscribed circle of the hub-locking member is larger than the diameter of the inscribed circle along the hub toothings.

14. A storage container as claimed in claim 13, wherein the space between the two engaging keys is larger than the diameter of one hub-toothing in the direction of the circumference of the hub.

15. A storage container as claimed in claim 14, wherein the upper ends of said engaging keys are inclined downward from said boss.

16. A storage container as claimed in claim 15, wherein the upper ends of said engaging keys are pointed.

17. A storage container as claimed in claim 15, wherein the upper ends of said engaging keys are trigonal pyramid forms.

18. A hub locking member adapted to be inserted into a freely rotatable hub having a plurality of hub toothings substantially equally spaced and having inner facing end faces and projecting radially inwardly within a drive shaft inserting hole of the hub; said hub locking member preventing the free rotation of said hub, which comprises a column like boss engageable within the drive shaft inserting hole of the hub and includes two engaging keys substantially radially, outwardly extending from said boss wherein the improvement is characterized in that said boss has a substantially conical top portion and said keys are arranged in such a manner that at least one of said engaging keys extends into a space between two adjacent hub-toothings while the outermost portion of the other engaging key is located in radial alignment with the end face of any of said hub-toothings.

19. A hub locking member as claimed in claim 18, wherein the height of said boss is greater than the height of said keys.

20. A hub locking member as claimed in claim 19, wherein the upper ends of said engaging keys are pointed.

21. A hub locking member as claimed in claim 20, wherein the hub locking member is a cylindrical column.

22. A hub locking member as claimed in claim 21, wherein said cylindrical columnar boss is formed from two parts of acylindrical column having different radii.

* * * * *